(12) United States Patent  (10) Patent No.: US 8,051,243 B2
Murase  (45) Date of Patent: Nov. 1, 2011

(54) FREE SPACE UTILIZATION IN TIERED STORAGE SYSTEMS

(75) Inventor: Atsushi Murase, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 656 days.

(21) Appl. No.: 12/149,290

(22) Filed: Apr. 30, 2008

(65) Prior Publication Data

US 2009/0276588 A1   Nov. 5, 2009

(51) Int. Cl.
*G06F 12/00* (2006.01)
(52) U.S. Cl. .......................... 711/114; 711/170
(58) Field of Classification Search .............. 711/114, 711/170
See application file for complete search history.

(56) References Cited

U.S. PATENT DOCUMENTS

| 7,822,939 | B1* | 10/2010 | Veprinsky et al. | 711/170 |
|---|---|---|---|---|
| 2004/0162958 | A1 | 8/2004 | Kano et al. | |
| 2005/0228945 | A1* | 10/2005 | Nagata | 711/114 |
| 2006/0069862 | A1* | 3/2006 | Kano | 711/114 |
| 2006/0155950 | A1* | 7/2006 | Smith | 711/171 |
| 2007/0208788 | A1* | 9/2007 | Chakravarty et al. | 707/204 |
| 2009/0006799 | A1* | 1/2009 | Korupolu et al. | 711/170 |

OTHER PUBLICATIONS

Data Progression Storage Center/Datasheet,"Delivering on the Promise of Tiered Storage",Compellent, pp. 1-6, 2007.
"Optimizing Exchange Server in a Tiered Storage Environment",White Paper, Nov. 2006, Compellent, pp. 1-8, 2006.
U.S. Appl. No. 11/605,440, filed Nov. 29, 2006, by Atsushi Murase.

* cited by examiner

*Primary Examiner* — Hashem Farrokh
(74) *Attorney, Agent, or Firm* — Mattingly & Malur, PC

(57) ABSTRACT

Embodiments of the invention include first storage mediums having first storage characteristics for making up a first pool of capacity of a first tier of storage, and second storage mediums having second storage characteristics for making up a second pool of capacity of a second tier of storage. Free capacity of the first and second pools is shared between the first and second tiers of storage. When the first pool has an amount of free capacity available over a reserved amount of free capacity reserved for first tier data, a first quantity of second tier data is moved from the second tier to the first tier. In exemplary embodiments of the invention, the first and second storage mediums are contained within one or more thin provisioning storage systems, and data is moved between the first and second tiers by allocating thin provisioning chunks to the data being moved.

23 Claims, 13 Drawing Sheets

Logical Element Structure

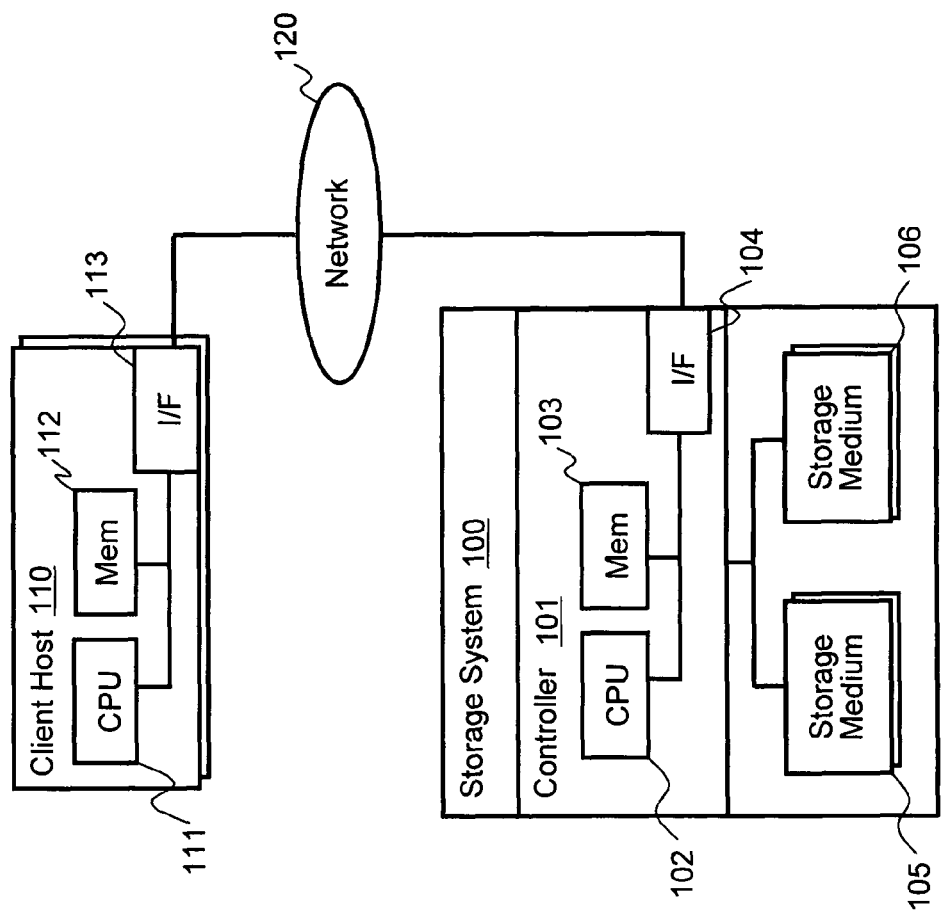
FIG. 1A Hardware Architecture

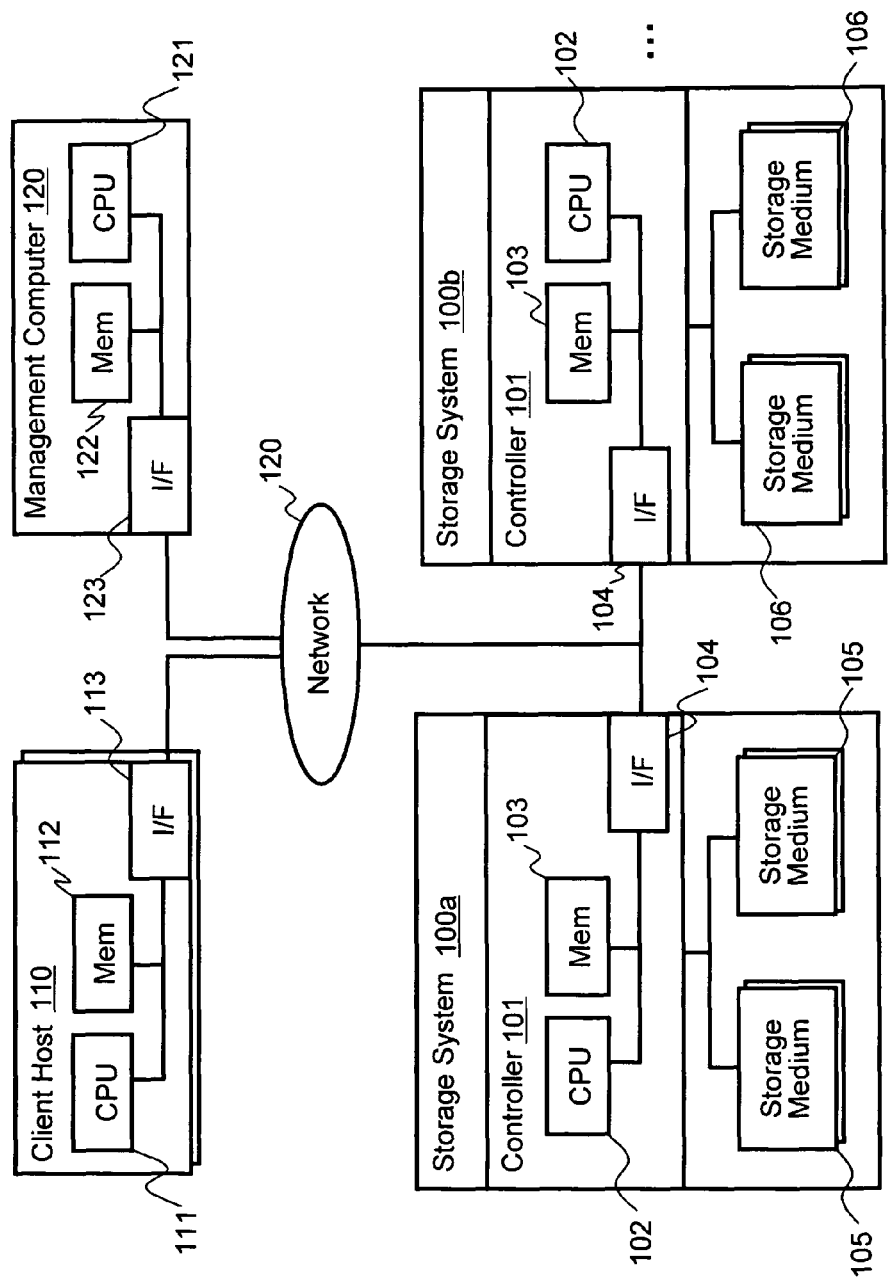
FIG. 1B Hardware Architecture

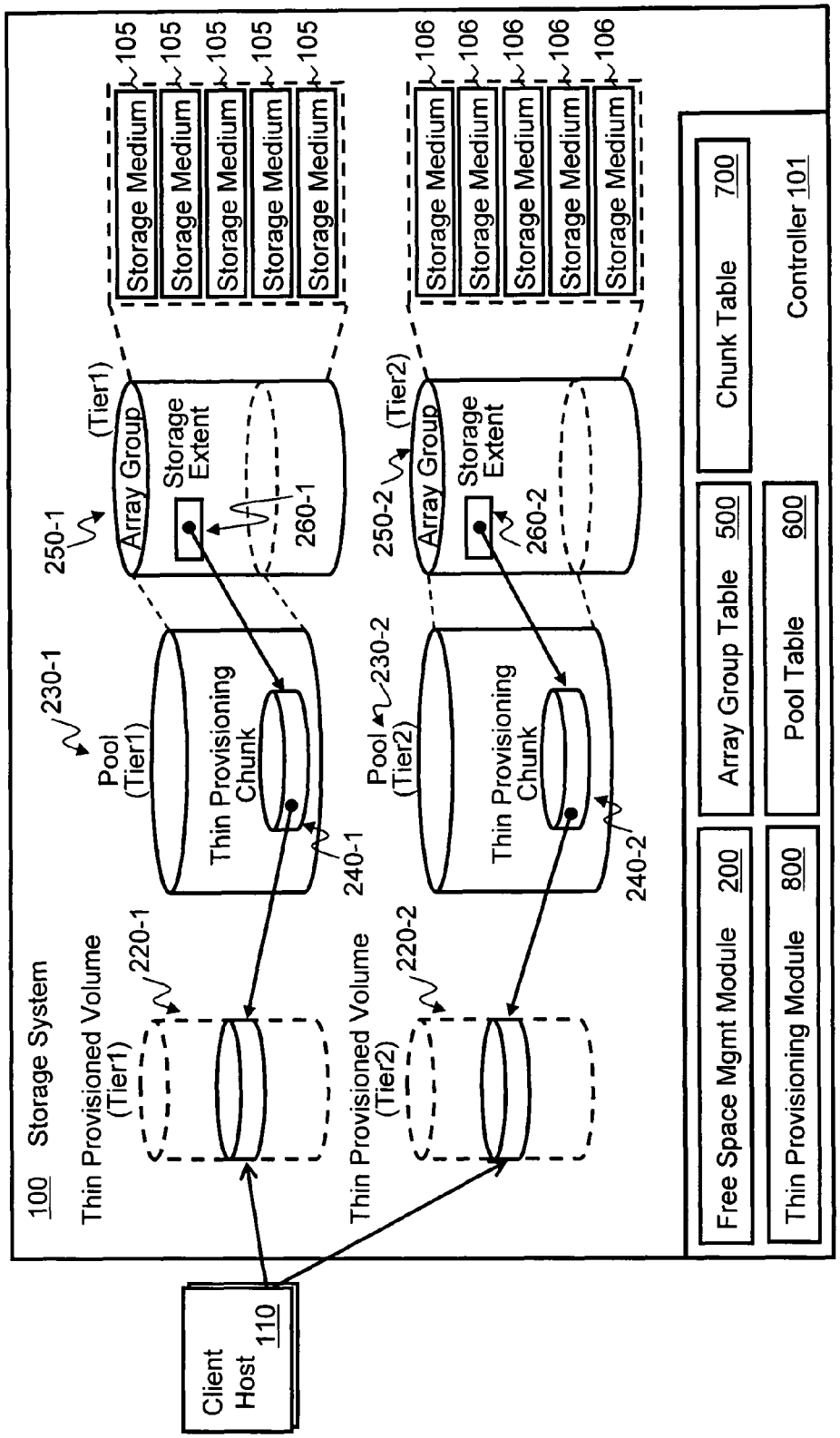
FIG. 2 Logical Element Structure

FIG. 3 Data Structure of Array Group Table

| Array Group ID | Total Capacity | Available Capacity |
|---|---|---|
| A1 | 30 TB | 20 TB |
| A2 | 40 TB | 10 TB |
| ... | ... | ... |

FIG. 4 Data Structure of Pool Table

| Pool ID | Tier | Total Space | Free Space | Alert Threshold | Margin Space | Array Group ID |
|---|---|---|---|---|---|---|
| P1 | Tier1 | 10 TB | 3 TB | 1 TB | 1 TB | A1 |
| P2 | Tier2 | 30 TB | 7 TB | 2 TB | (n/a) | A2 |
| ... | ... | ... | ... | ... | ... | ... |

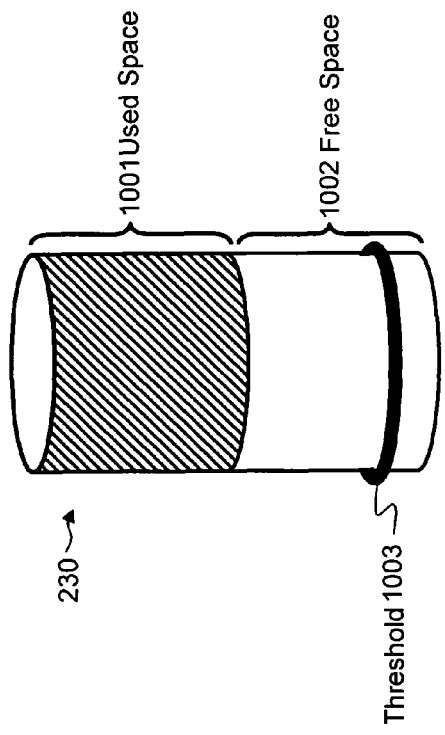
FIG. 5 Data Structure of Chunk Table
FIG. 6 Pool Structure

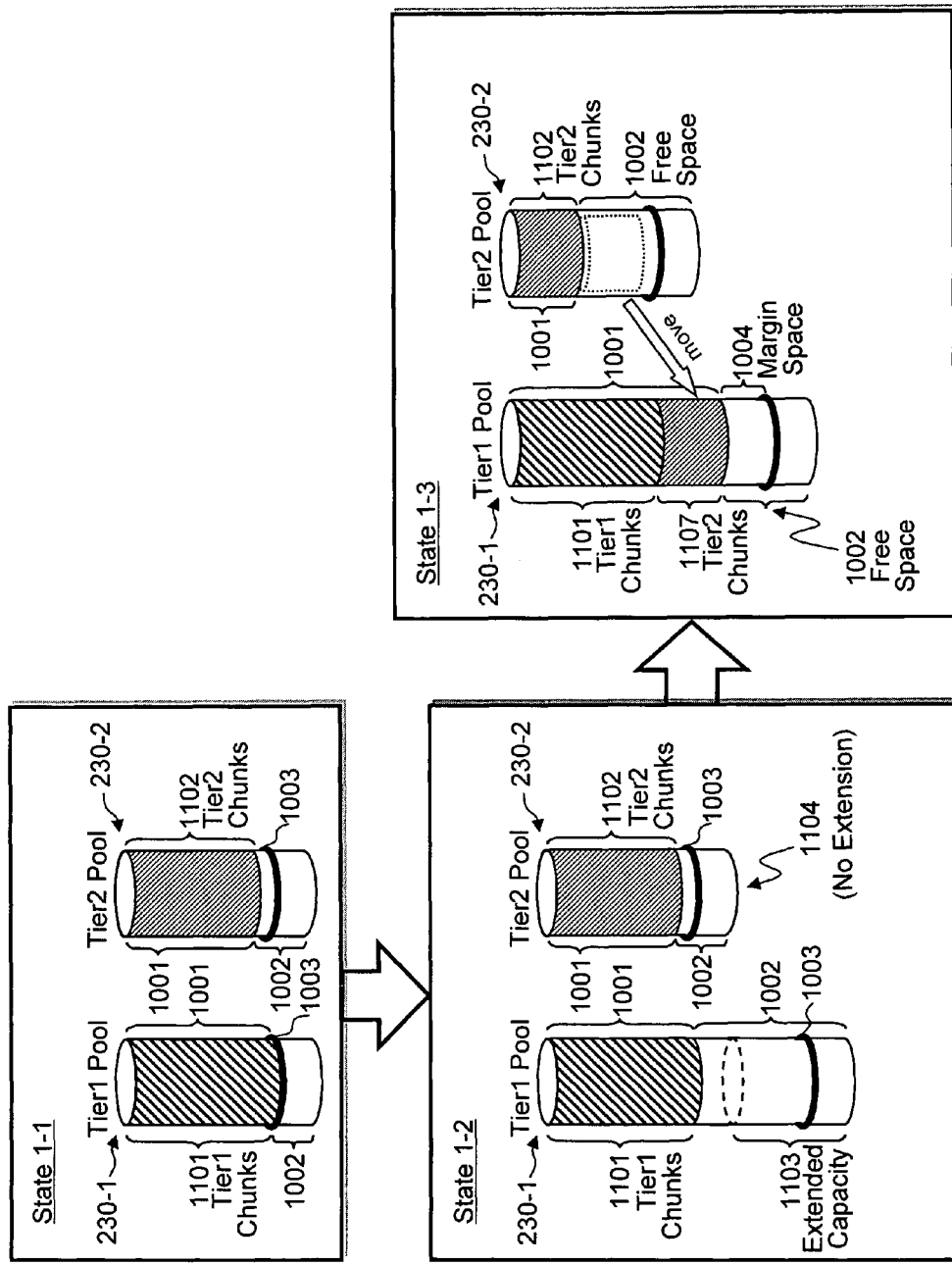
FIG. 7 Pool Operation – Tier1 Pool Extension

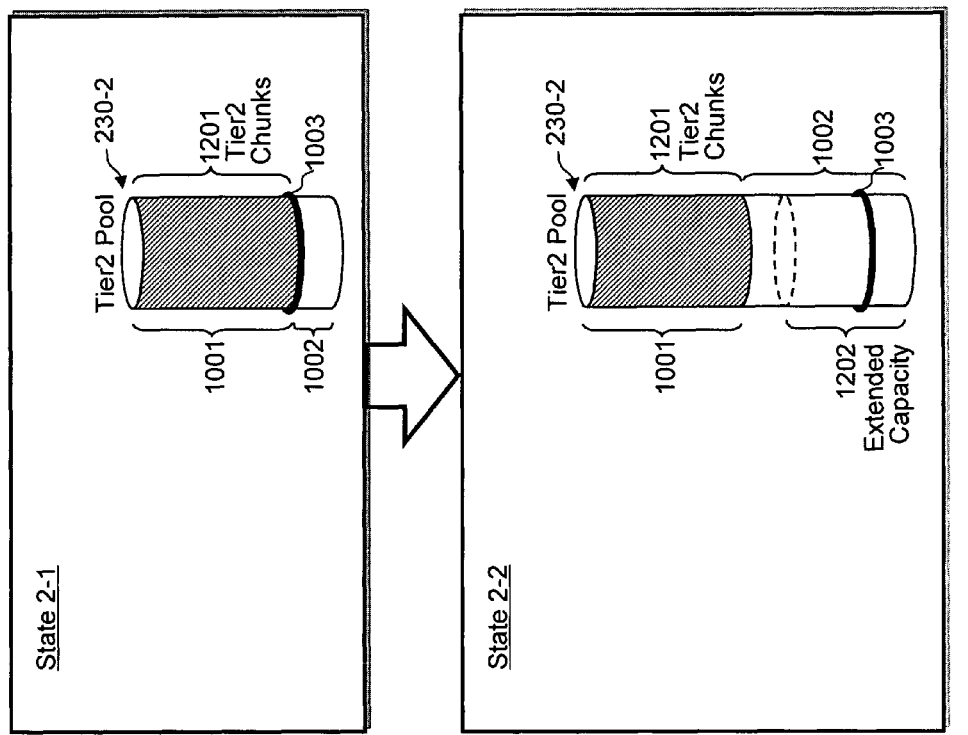
FIG. 8 Pool Operation – Tier2 Pool Extension

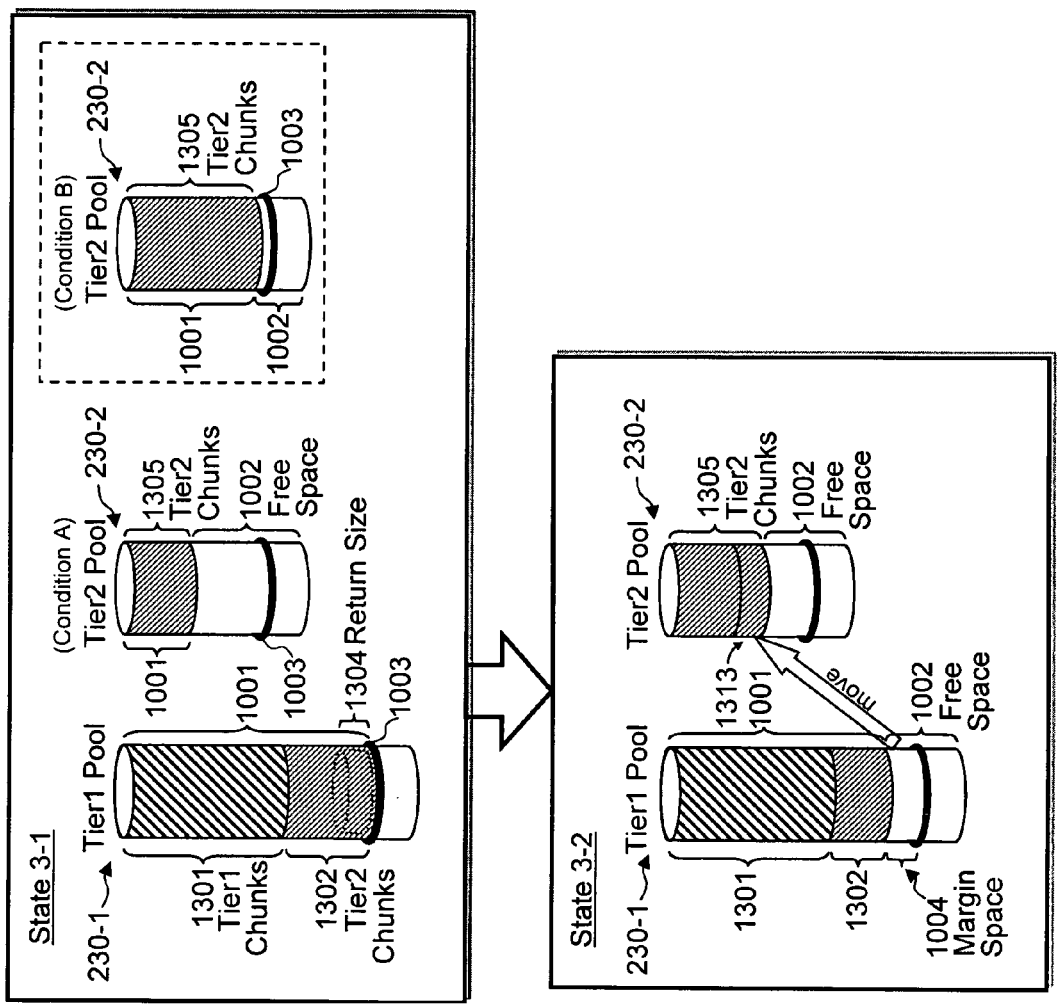
FIG. 9 Pool Operation – Returning Tier2 Chunks

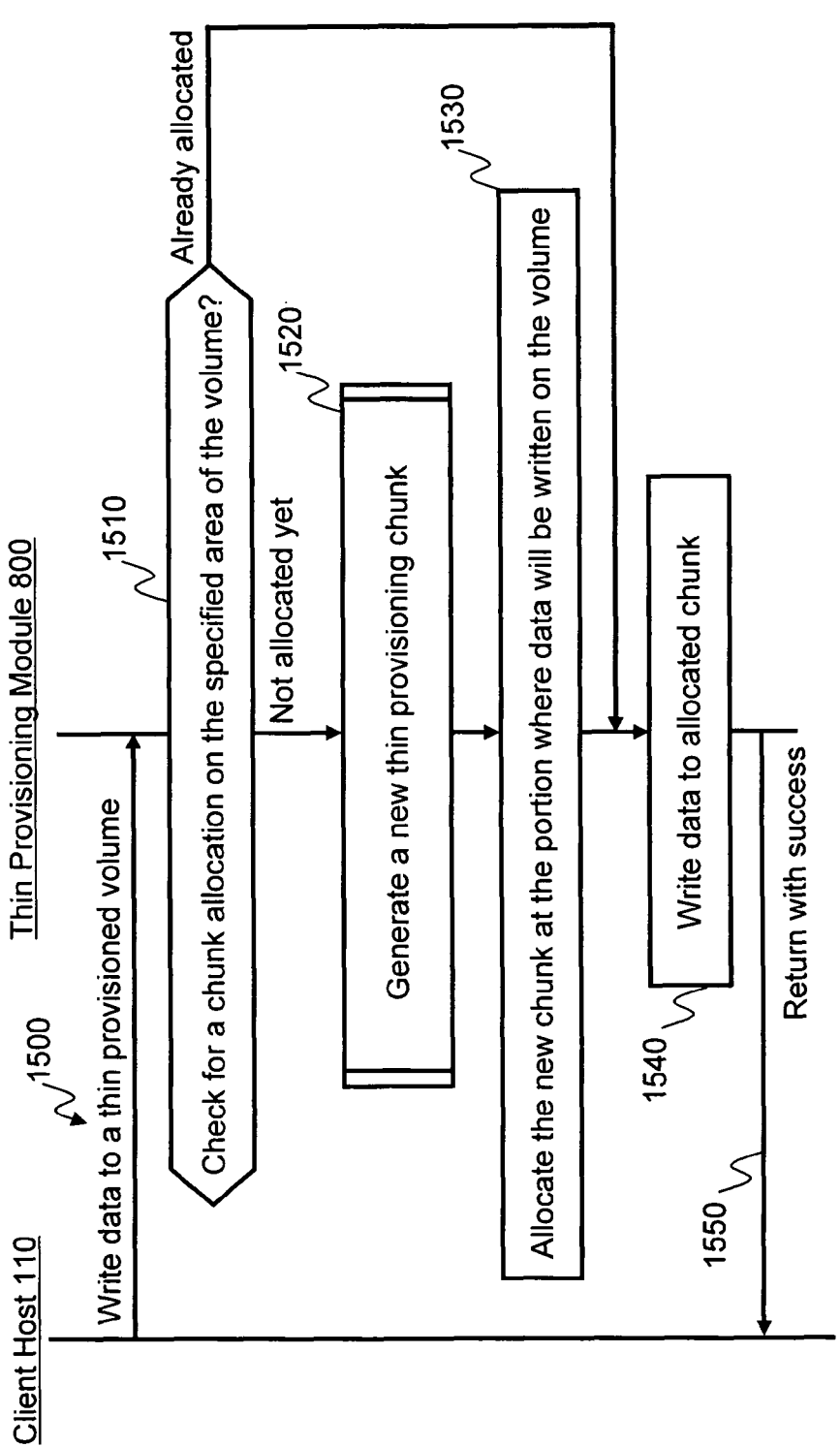
FIG. 10 Process to Write Data to Unallocated Area of a Thin Provisioned Volume

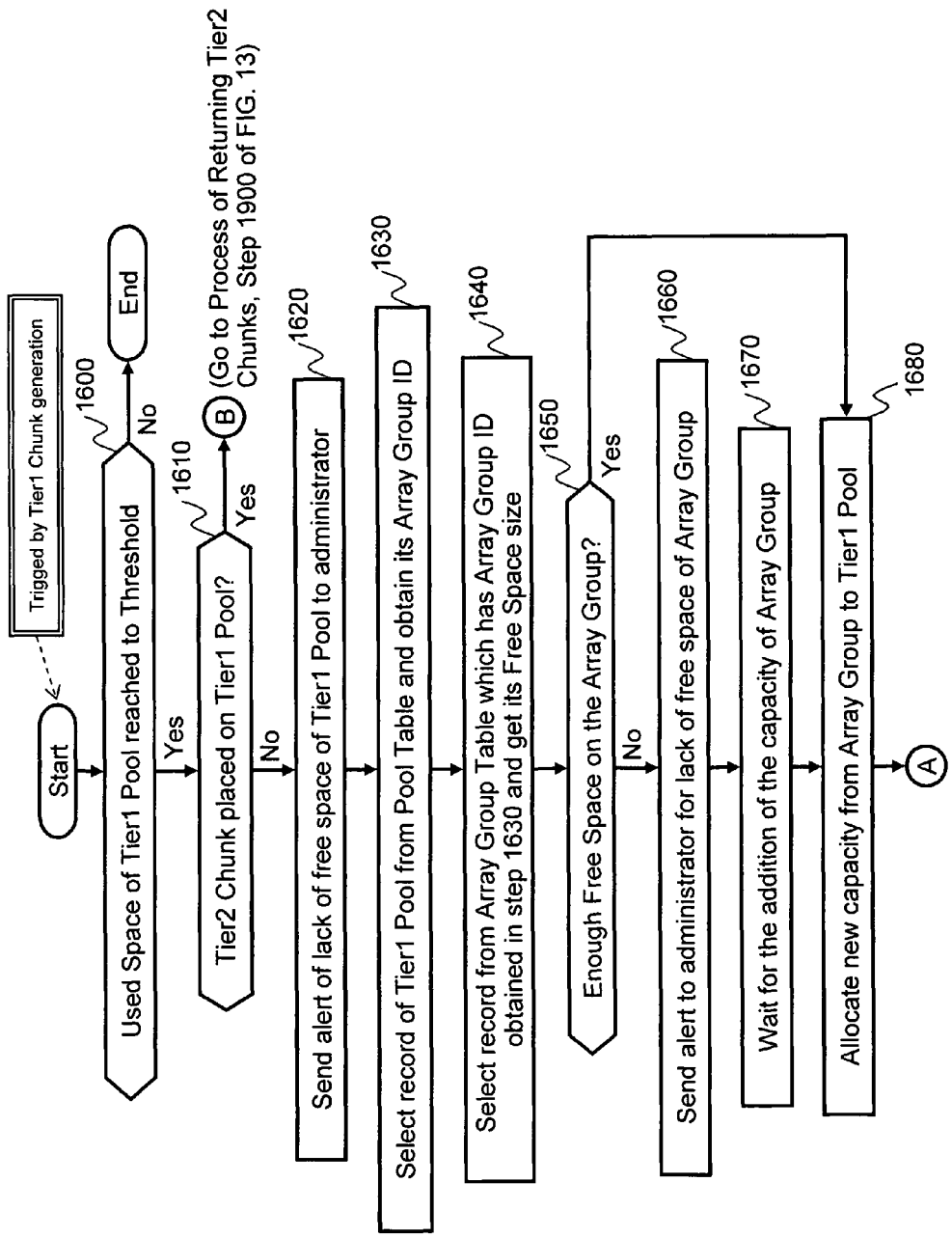
FIG. 11A Process of Tier1 Pool Extension

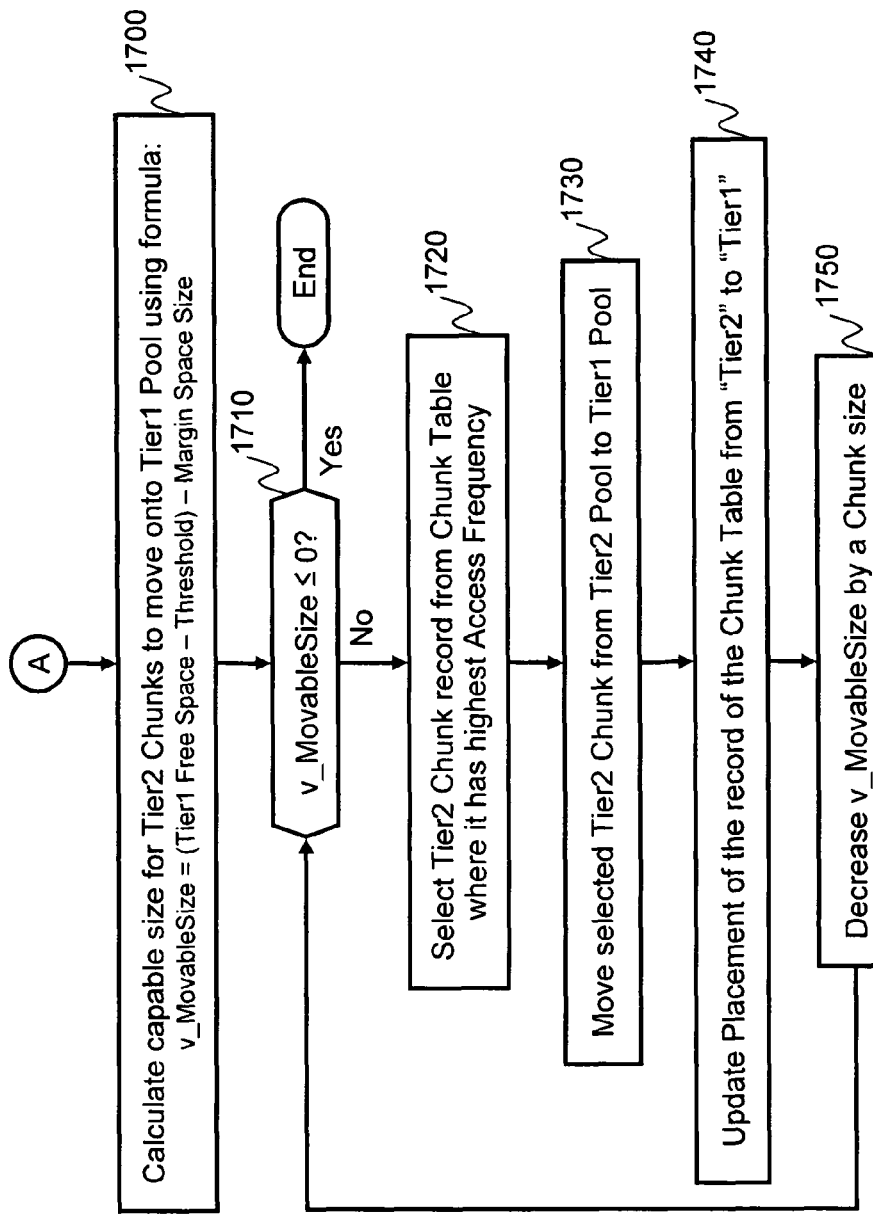
FIG. 11B Process of Tier1 Pool Extension (cont.)

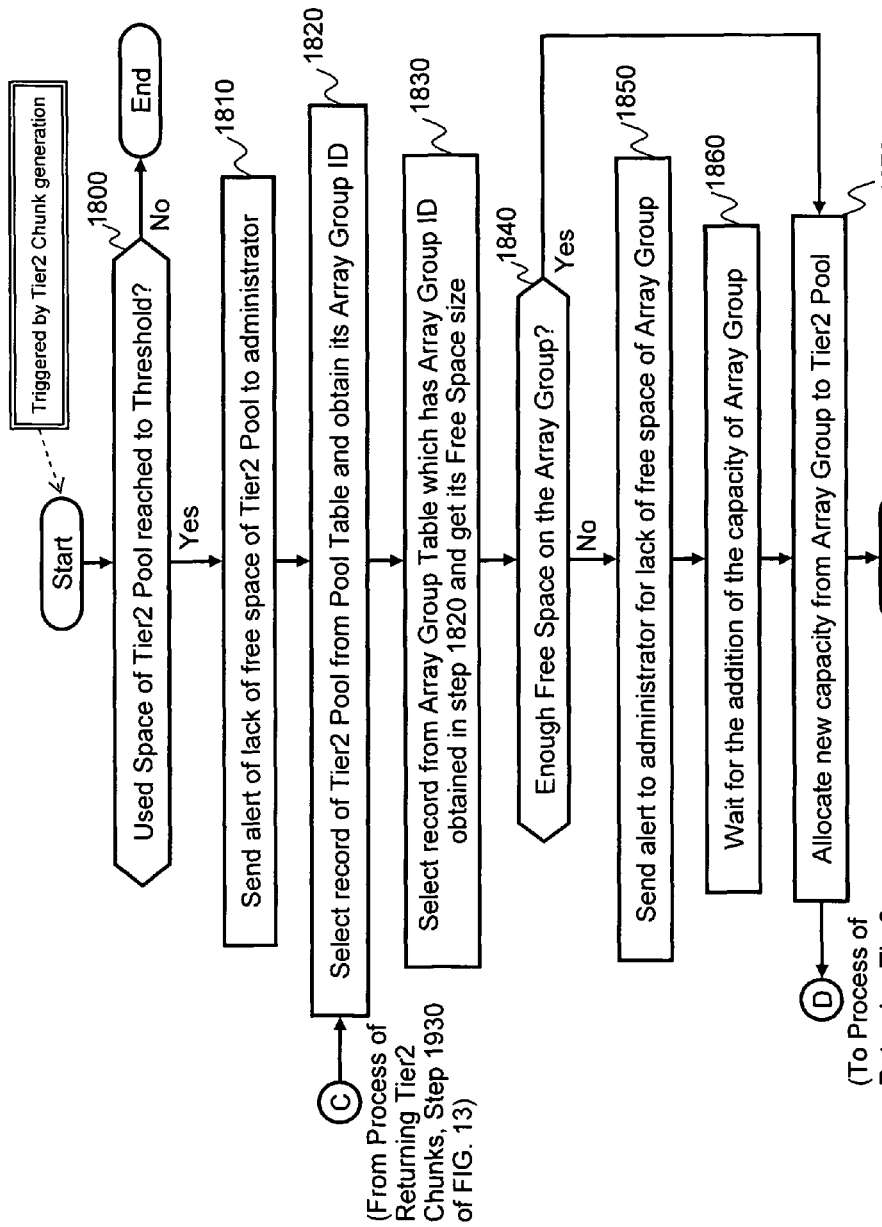
FIG. 12 Process of Tier2 Pool Extension

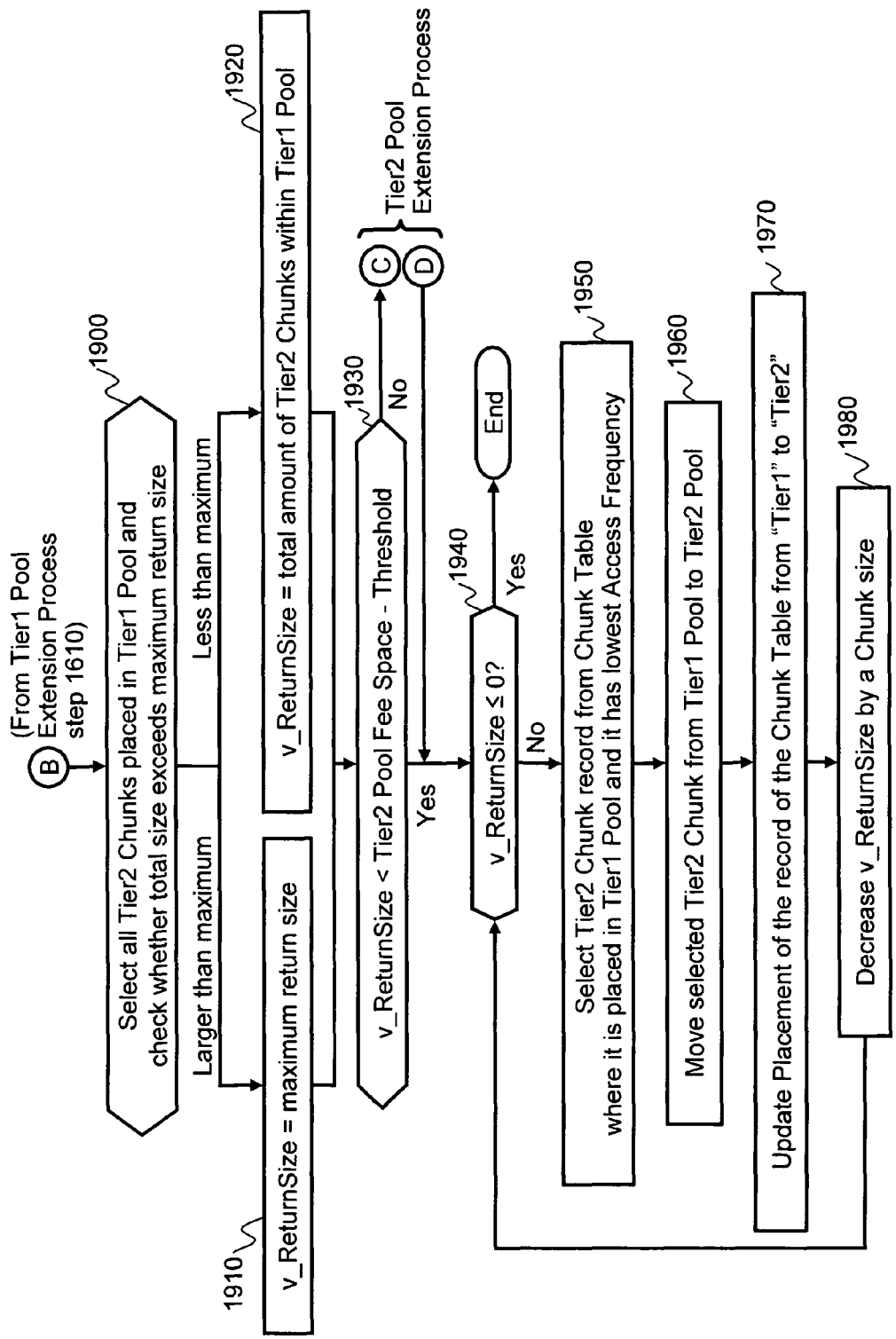
FIG. 13 Process of Returning Tier2 Chunks

FREE SPACE UTILIZATION IN TIERED STORAGE SYSTEMS

BACKGROUND OF THE INVENTION

Data storage devices are available in varying levels of quality and performance. Typically, the level of quality and performance is inversely proportional to the cost of the storage device. Because the importance of being able to quickly access data, the frequency of data access, and the level of reliability required varies widely among different users and different types of stored data, not all data needs to be stored in high performance storage devices. Also a vast majority of stored data is usually never accessed or accessed only infrequently. Thus, in order to minimize the costs associated with data storage, each piece of data should be stored in a storage device having an appropriate quality and performance level in accordance with the attributes of the data being stored and the needs of the users of the data.

Another issue that storage administrators frequently encounter is low utilization of existing storage resources. Due to recent explosive growth in the amount of data being stored, many administrators do not have enough human resources to closely manage the entire storage system. As a result, it is nearly impossible for administrators to manually manage the expansion of every volume in the system on a day-to-day basis. This lack of manpower to closely manage each volume causes many volumes to be over-allocated so as to be prepared for the possible addition of a large amount of data, which may in fact never occur. This over-allocation ties up huge amounts of unutilized space in conventional storage systems.

Tiered storage is a solution for reducing the cost of storing data by differentiating various types of data, and then storing the data in storage devices that are selected to provide an appropriate level of reliability and performance. For example, a SAN (Storage Area Network) may include plural storage tiers such as a high reliability, high performance, and premium cost first tier that may be used for important data that is accessed often, and a lower reliability, lower performance, and less expensive second tier that may be used for archive data or other infrequently-accessed data. Data can be stored according to a classified type, owner, or the like, and also may be migrated between tiers based on various situations and contingencies. Thus, by using these various levels of tiered storage resources, the total cost of storage can be reduced, while required access speed or reliability for specific data can still be maintained.

Furthermore, thin provisioning is a solution that helps improve the efficiency of storage utilization and eliminate wasted capacity. Thin provisioning systems typically present a virtualized full-volume capacity to a host computer. However, the system actually only allocates real storage capacity to particular portions the thin provisioned volume when the particular portion of the volume receives data to be stored. The units of partial storage capacity allocated to a thin provisioned volume may be referred to as "chunks", and the chunks of storage may be carved from a storage extent referred to as a "thin provisioning pool" at the time that a chunk is requested. Plural thin provisioned virtual volumes can share a thin provisioning chunk pool. By this arrangement, free space can be flexibly managed, which can reduce the amount of unutilized space in the storage system.

Each of the solutions discussed above can individually help achieve cost reduction and improve system utilization, but attempts to use these two solutions in the same storage system have not been successful in producing the desired increases in efficiency of capacity utilization. Since typically every tier maintains at least one respective thin provisioning pool which is created from storage resources of that tier, when there are a number N of tiers in the storage system, then a number N of redundant free spaces is produced in the storage system. Accordingly, when these multiple free spaces are not utilized, it adds to the overall cost of the system.

Related art includes US Pat. Appl. Pub. 2004/0162958, to Kano et al., entitled "Automated On-Line Capacity Expansion Method for Storage Device", filed Feb. 23, 2004; US Pat. Appl. Pub. 2006/0069862, to Kano et al., entitled "Method for Managing Volume Groups Considering Storage Tiers", filed Sep. 29, 2004; and U.S. patent application Ser. No. 11/605, 440, to Atsushi Murase, filed Nov. 29, 2006, the entire disclosures of which are incorporated herein by reference.

BRIEF SUMMARY OF THE INVENTION

Exemplary embodiments of the invention eliminate redundant free space used by thin provisioning pools among plural tiers in a storage system, thus reducing the overall costs for storage resources. In exemplary embodiments, this may be accomplished by sharing a free space of a tier among plural tiers, thereby eliminating the redundancy of having a free space for each tier. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 1A illustrates an example of a hardware configuration in which the method and apparatus of the invention may be applied.

FIG. 1B illustrates another example of a hardware configuration in which the method and apparatus of the invention may be applied.

FIG. 2 illustrates an example of a logical configuration of the invention applied to the architecture of FIG. 1A.

FIG. 3 illustrates an exemplary data structure of an array group table.

FIG. 4 illustrates an exemplary data structure of a pool table.

FIG. 5 illustrates an exemplary data structure of a chunk table.

FIG. 6 illustrates an exemplary structure of a pool.

FIG. 7 illustrates an exemplary pool operation during tier 1 pool extension.

FIG. 8 illustrates an exemplary pool operation during tier 2 pool extension.

FIG. 9 illustrates an exemplary pool operation with tier 2 chunks returning.

FIG. 10 illustrates an exemplary process of writing data to an unallocated area of a thin-provisioned volume.

FIGS. 11A-11B illustrate an exemplary process of tier 1 pool extension.

FIG. 12 illustrates an exemplary process of tier 2 pool extension.

FIG. 13 illustrates an exemplary process of tier 2 chunks returning.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment" or "this embodiment" means that a particular feature, structure, or characteristic described in connection with the embodiment is included in at least one embodiment of the invention, and the appearances of these phrases in various places in the specification are not necessarily all referring to the same embodiment. Additionally, the drawings, the foregoing discussion, and following description are exemplary and explanatory only, and are not intended to limit the scope of the invention in any manner. For example, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations on data bits within a computer. These algorithmic descriptions and representations are the means used by those skilled in the data processing arts to most effectively convey the substance of their work to others skilled in the art. An algorithm is here, and generally, understood to be a series of defined steps leading to a desired end state or result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the action and processes of a computer system or other information processing device that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer readable storage medium, such as, but not limited to optical disks, magnetic disks, read-only memories (ROMs), random access memories (RAMs), solid state devices and drives, or any other type of media suitable for storing electronic information. The algorithms and displays presented herein are not inherently related to any particular computer or other apparatus. Various general-purpose systems may be used with programs in accordance with the teachings herein, or it may prove convenient to construct a more specialized apparatus to perform desired method steps. The structure for a variety of these systems will appear from the description set forth below. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs, for reducing storage resource costs by minimizing the entire amount of unutilized space in a tiered storage system, especially when thin provisioning has been adopted. When embodiments of the invention are utilized, storage administrators do not need to buy large amounts of excess storage capacity in advance, and are able to deploy a particular amount of capacity when the particular amount of capacity is actually needed.

In some embodiments, a free space utilization method for a tiered storage system provides storage volumes to the hosts which have multiple storage quality characteristics. Typically highest grade volumes may be referred to as "Tier1" volumes having capacity allocated from high-speed, high performance storage devices. "Tier2" volumes may be of lower performance and reliability, having capacity allocated from lower performance, less expensive storage devices. "Tier3" volumes may be of even lower grade, may be created using yet other types of lower-cost storage devices, and so on. In some embodiments, thin provisioning technology is provided for each tier of volumes. Thereby, plural thin provisioning pools for respective tiers exist, and each pool for each tier offers a specific quality of thin provisioning chunks to the virtual (thin provisioning) volumes created within that tier.

In exemplary embodiments, the system of the invention determines when extra capacity has been added to the Tier1 pool. When the Tier1 pool has a sufficient amount of free space, the system may move some amount of Tier2 chunks from the Tier2 pool to the Tier1 pool to reduce the overall amount of free space in the Tier1 and Tier2 pools. In some embodiments, while moving the Tier2 chunks to the Tier1 pool, the system can select chunks that have recently been frequently accessed. Further, in some embodiments, when the system finds that free space in the Tier1 pool is getting low, while some Tier2 data is mixed in with the Tier1 pool, the system can return some amount of Tier2 chunks to the Tier2 pool so as to make more room in the Tier1 pool for additional Tier1 chunks. Additionally, during the migration of Tier2 chunks from the Tier1 pool to the Tier2 pool, the system may select Tier2 chunks that have lower access frequency, and migrate these chunks preferentially.

In exemplary embodiments, by moving Tier2 chunks between the Tier1 pool and Tier2 pool when either pool has enough free space, a logical configuration is created so that the total amount of free space gathered from respective tiers is shared between each tier's pool. For instance, when the storage administrator adds new capacity to the Tier1 pool and at the same time if the Tier2 pool has low free space, the administrator does not need to buy additional capacity for the Tier2 pool at that time. Thus, embodiments of the invention eliminate redundant capacity by unifying pool free space between tiers and by keeping the overall free space in the system to a minimum size from the perspective of the entire system, thereby reducing the overall costs of the storage resources.

First Embodiment

Hardware Architecture

FIG. 1A illustrates an example of a physical hardware architecture of an information system in which first embodiments of the invention may be implemented. The overall system consists of a storage system 100 and one or more client host computers 110. Client hosts 110 and storage system 100 may be operatively connected for communication through a network 120, which may be any type of network or other connection enabling communication.

In the illustrated embodiments, storage system 100 includes a controller 101 and plural storage mediums 105 and 106. Storage controller 101 includes a CPU 102, a memory 103, and a network Interface 104. Storage mediums 105, 106 are connected to controller 101, such as through a disk interface (not shown), and may have differing storage characteristics from each other for creating different tiers of storage. For example, in some embodiments, storage mediums 105 can be Fibre Channel (FC) disk drives that make up a first tier of storage (Tier1), while storage mediums 106 might be SATA disk drives that make up a second tier of storage (Tier2). In other embodiments, solid state storage devices (e.g., flash memory) might be used as one type of storage medium, while FC or SATA disk drives might be used as a second or third type of storage medium, and so forth. Other known storage mediums may also be used for creating different tiers, such as hybrid solid state/magnetic disk drives, optical disk drives, magnetic tape or the like. Further, while two types of storage mediums 105, 106 are illustrated, a larger number of different tiers including the same types or different types of storage mediums may be incorporated into storage system 100. For example, there may be three or four different tiers, and each tier may be made up of a different storage medium, or multiple kinds of storage mediums, depending on the particular configuration desired. Also, different tiers may be made up of the same type of storage medium, but may have other storage characteristics that are different, such as a lower tier being spun down or powered down to conserve energy, a one tier being be located in a separate storage system, or the like. Additionally, storage mediums 105, 106 may be contained in the same casing, or in separate casings, and may be in communication with controller 101 via direct connection, over a backend network, or through other means. Thus, the invention is not limited to any particular type of storage media or any particular arrangement of the storage media.

Each client host computer 110 may be a generic computer that includes a CPU 111, a memory 112, and a network Interface 113. For example, client host 110 may be a terminal computer used by the storage service user. In some cases, client host computer 110 may run an application that uses storage system 100 for storing and accessing application data. Other examples of use will also be apparent to those of skill in the art.

FIG. 1B illustrates another example of a hardware configuration in which embodiments of the invention may be practiced. In the embodiments illustrated in FIG. 1B, a first storage system 100a includes storage mediums 105 for comprising a first storage tier (Tier1), and a second storage system 100b has storage mediums 106 for comprising a second storage tier (Tier2). For example, storage mediums 105 may be FC disk drives and storage mediums 106 may be SATA disk drives, although, any other storage mediums or combinations thereof may be used, as discussed above. A number of external storage systems 100 may be provided, and each may have storage mediums of one or more types, each providing one or more tiers of service. Furthermore, in some embodiments, a management computer 120 may be provided in communication with network 120 via an interface 123. Management computer 120 includes a CPU 121 and a memory 122. Other possible hardware configurations will also be apparent to those of skill in the art in view of the present disclosure, and thus, the invention is not limited to any particular hardware configuration.

Logical Element Structure

FIG. 2 illustrates an exemplary embodiment of a software and logical element structure that may be implemented on the hardware configuration of FIG. 1A. The embodiment of FIG. 2 illustrates a plurality of thin provisioned volumes 220 created from thin provisioned pools 230, which in turn are created from array groups 250. Array groups 250-1, 250-2 serve as logical storage capacity which is composed of plural storage mediums 105, 106, respectively, and which may be arranged in a RAID (redundant array of independent disks) configuration as RAID groups. For example array groups 250 may be composed in a RAID 5 configuration that includes stripes of 4 disks of data and 1 parity disk, as is known in the art. In some embodiments of the invention, an array group is constructed from disks that all having matching storage characteristics (e.g., the same type of disks), for example, all of storage mediums 105 may be FC disks, which are not mixed with other disks, such as SATA disks, which may be used as storage mediums 106.

A storage extent 260-1, 260-2 is a small quantity of storage capacity which is carved from one of array groups 250 as a finite piece of storage capacity. Generally the array group 250 itself is not shown directly to the end user in a thin provisioning storage system, but only the amount of capacity of the array group 250 which is able to be allocated is provided as a pool 230 of thin provisioning chunks. For example, as illustrated, a portion of the array groups 250 may be allocated to thin provisioning pools 230, while a remaining portion of the array groups may be reserved for other uses, or the like. Although, in other embodiments the entire capacity of an array group 250 may be allocated to a corresponding thin provisioning pool 230.

In FIG. 2, thin provisioning pool 230-1 is a thin provisioning pool of chunks for Tier1 allocated from array group 250-1, which is created from the physical capacity provided by the storage mediums 105, which may be high-performance FC disks or solid state drives in the preferred embodiment. Similarly, thin provisioning pool 230-2 is a thin provisioning pool of chunks for Tier2 allocated from array group 250-2, which is created from physical capacity provided by the storage mediums 106, which may be SATA disk drives, or other lower-cost storage mediums in the preferred embodiments.

Each thin provisioned volume 220 is a storage volume that is presented to client hosts 110 as a storage volume having an available capacity. For example, in the illustrated embodiment, thin provisioned volume 220-1 is presented as a Tier1 volume, while thin provisioned volume 220-2 is presented as a Tier2 volume. Each thin provisioned volume 220 is represented as if it has a full capacity of its allocated size, but actual physical capacity is allocated to only the portions of the thin provisioned volume 220 to which the client host computer has actually stored data. When the client host writes data to an area of thin provisioned volume 220 to which a real storage extent has not yet been allocated, then the storage system 100 will generate a new thin provisioning chunk 240 and assign the new chunk to the thin provisioned volume 220 as the storage capacity to which the client host stores the new write data. The allocation of a new chunk 240 by the storage system 100 is transparent to the client host 110, which typically stores the data to a logical address in the volume 220, and the client host 110 does not need to know whether or not a chunk has been allocated for particular addresses in the storage volume 220. US Pat. Appl. Pub. 2004/0162958, to Kano et al., which was incorporated herein by reference above, discusses details of chunk allocation in a thin provisioning storage system.

Elements on the Controller

In exemplary embodiments, a free space management module 200 may run on the controller 101 of storage system 100, and handle optimization of the free spaces among the respective tier pools 230. Further, a thin provisioning module 800 handles the thin provisioning tasks of storage system 100. These modules 200, 800 may be loaded in memory 103 or other computer readable medium, and may be executed by CPU 102 for carrying out embodiments of the invention. An array group table 500 holds records of array group information for the free space management module 200 to determine whether enough space is left in a particular array group 250 to carve more capacity for the specific pool 230 when the specific pool 230 has a low amount of free space. Additionally, a pool table 600 maintains records regarding tier type, free space size and alert threshold for each tier of the thin provisioning pools. Further, a chunk table maintains records pertaining to chunk information, such as which tier of content is stored in a chunk, which pool of which tier currently holds a particular chunk, and what the data access frequencies of particular chunks over the latest time period are. Each of these tables is described further below.

Furthermore, with respect to the embodiments of the invention illustrated in FIG. 1B, free space management module 200, array group table 500, pool table 600, and chunk table 700 may be maintained on the management computer 120. In these embodiments, management computer 120 carries out the method of the invention related to management of the free space in the tiered storage systems 100, while the thin provisioning functions themselves may be carried out by each storage system 100a, 100b. In yet alternative embodiments, the management computer 120 may be eliminated, and one of controllers 101 of one of the storage systems 100 may manage the free space of all the storage systems 100 in the information system. For example, storage system 100a may contain storage devices having Tier1 storage characteristics, and storage controller 101 of storage system 100a may manage the free space in storage system 100a and also manage the free space of storage system 100b, which contains storage devices having Tier2 storage characteristics. In some examples of these embodiments, storage system 100a may have internal storage mediums 105 making up a first tier of storage, and storage system 100b may be one or more externally-attached storage mediums 106, such as an external disk array, providing a second tier of storage, and storage system 100b may be provided with or without controller 101.

In a further example, storage system 100a may be a system that includes virtualization capability, such as Hitachi's Universal Storage Platform™ available from Hitachi Data Systems of Santa Clara, Calif. In this arrangement, storage system 100a provides virtualized thin provisioned volumes to client hosts 110. The actual storage capacity may be provided by external storage system 100b, and one or more additional external storage systems (not shown) similar to storage system 100b, and which have different tiers of storage mediums provided therein. In this arrangement, storage system 100a may contain and process the modules and data structures for carrying out the invention, as described above with respect to FIG. 2, or alternatively, the modules and data structures may be maintained and processed by a management computer 120 in communication with storage systems 100. Other possible arrangements will also be apparent to those of skill in the art in view of the disclosure set forth here in.

Data Structures

FIG. 3 illustrates an exemplary data structure of array group table 500. Array group table 500 includes an array group ID 510, which provides identification of the array group; total capacity 520, indicates the total capacity of the array group; and available capacity 530 indicates the remaining free capacity of the array group that has not yet been used. For instance, line 591 represents a record of an array group which has "A1" as the array group ID, a total capacity of "30 TB", and an available capacity of "20 TB" of remaining free space. Array group table 500 is referred to by free space management module 200 when determining whether enough free space is left in a particular array group to carve more capacity for a specific pool when the specific pool has low free space.

FIG. 4 illustrates an exemplary data structure of pool table 600. Pool table 600 includes an entry for pool ID 610, which is the identifier of the particular pool; Tier 620 entry indicates the tier type of the corresponding pool; total space 630 entry indicates total capacity of the corresponding pool; free space 640 entry indicates free space size of the corresponding pool; and alert threshold 650 indicates the threshold at which the pool is falling below capacity to generate new chunks for the tier volumes. When the free space is less than the threshold, then an alert will be indicated to an administrator so that the administrator can make a decision on whether to add more capacity, or take other action. A margin space 660 indicates an amount of capacity that is reserved in a tier for use in storing new chunks of data stored to that tier. For example, as discussed below, Tier2 data chunks may be stored in the Tier1 pool to share free capacity and reduce the amount of the unallocated capacity in the system. However, for efficiency, it is necessary to reserve some margin amount 660 of capacity in the Tier1 pool so that when new Tier1 data is stored to Tier1 storage, there will be some available capacity already existing, and it will not be necessary to migrate a Tier2 chunk out of the Tier1 pool to create sufficient capacity each time a new Tier1 chunk is stored. Further, array group ID 670 provides an identification of the array group from which the corresponding pool has been carved. For instance, line 691 represents a record of a thin provisioning pool which has "P1" as the pool ID, and which indicates that this pool is classified as "Tier1", has "10 TB" total capacity and "3 TB" of size remaining for allocating new chunks. Line 691 further indicates that an alert will be provided when the free space falls below "1 TB", that the margin space for Tier1 is "1 TB", and that this pool has been carved from array group "A1". Pool table 600 is referred to by free space management module 200 when determining the free space size of the pool and for indicating an alert, when needed.

FIG. 5 illustrates an exemplary data structure of chunk table 700. Chunk table 700 includes entries for a chunk ID 710, which is an identifier of the particular chunk; data content 720, which specifies the tier in which the data of the particular chunk is classified as belonging to; a placement entry 730, which indicates the actual tier that the data of the chunk is currently stored in; and an access frequency entry 740, which indicates an access frequency for the data within this chunk during the latest period of time over which access frequency has been measured. For instance, line 792 represents a record of a chunk that is classified as being stored as "Tier2", but which is currently placed in the "Tier1" pool. This data has been accessed "15" times during the predetermined period of time over which the access frequency was measured. Chunk table 700 is also referred to by free space management module 200 when selecting which Tier2 chunk should be moved from/to the Tier1 pool based on access frequency of each Tier2 chunk.

Pool Structure and Operation

FIG. 6 illustrates a general example of a logical structure of a thin provisioning pool 230. Used space 1001 is the pool capacity that has been already used to carve chunks for thin provisioned volumes. Free space 1002 is the remaining capacity that has not yet been used in the thin provisioning pool. Threshold 1003 specifies the threshold at which the free space of the pool is too low, and that an alert should be indicated to the administrator that more capacity may need to be added to the pool 230, and/or the system may automatically add more free space to the pool. Thus, while all of the free space 1002 is available for use for creating chunks, after the threshold 1003 is passed, it is desirable to add more capacity to the pool 230 so that pool 230 will not run out of space and adversely affect operation of the storage system.

FIG. 7 illustrates an example of a pool operation for adding new capacity to a thin provisioning pool. In the particular example illustrated, new capacity will be added to the Tier1 pool and efficiently utilized. Initially, state 1-1 illustrates that used space 1001 of the Tier1 pool 230-1 has reached its threshold 1003 in accordance with requests for allocation of the Tier1 chunks 1101, so that the free space 1002 has reached the threshold 1003. In this example, Tier2 chunks 1102 are also allocated in Tier2 pool 230-2 close to its threshold 1003 as well. In this case, when the threshold 1003 of Tier1 pool 230-1 is reached, free space management module 200 checks chunk table 700 to determine whether or not any Tier2 chunks are placed in Tier1 pool. For example, in some situations, Tier2 chunks may be maintained in the Tier1 pool to better utilize available capacity of the higher performance storage devices. Thus, prior to sending an alert to the administrator to add more free space to the Tier1 pool, free space management module 200 will first attempt to move any Tier2 chunks that exist in the Tier1 pool to the Tier2 pool. If the Tier1 pool 230-1 is full of Tier1 chunks only, then this indicates that an alert for lack of free space in the Tier1 pool should be made to the administrator. Following the alert, free space management module 200 may (either autonomously, or by action of the administrator or other means that controls allocation of storage capacity) extend the capacity of the Tier1 pool using capacity available from the corresponding array group.

State 1-2 illustrates that Tier1 pool size has been extended to increase the free space 1002. Extended capacity 1103 indicates the size of additional capacity obtained from the array group 250-1. As indicated by arrow 1104, no extension of the capacity of the Tier2 pool 230-2 is made at this time, even though the Tier2 pool 230-2 is approaching its own threshold 1003.

State 1-3 illustrates that the free space management module 200 may thereafter move a certain amount of Tier2 chunks 1107 from Tier2 pool 230-2 to Tier1 pool 230-1. This action increases the free space 1002 of the Tier2 pool 230-2 while also maintaining a certain size of a margin space 1104 in the Tier1 pool 230-1. As discussed above, the margin space 1004 is a reserved amount of free capacity reserved in the Tier1 pool for allocation of new Tier1 chunks so that the entire added capacity is not filled with Tier2 chunks. The margin space size is specified in pool table 600 at margin space entry 660 by the storage administrator, storage policy, or the like. Free space management module 200 refers to pool table 600 when determining how large a margin space 1004 to reserve. By reserving a margin space 1004, efficiency is increased since it is not necessary to more a Tier2 chunk back to the Tier2 pool each time a new Tier1 chunk is allocated. Furthermore, by moving some of the Tier2 chunks to the Tier1 pool 230-1, no additional capacity is required to be allocated to the Tier2 pool 230-2 at this time. In exemplary embodiments, during the movement of the Tier2 chunks to the Tier1 pool, the free space management module 200 selects Tier2 chunks 1107 which have a high access frequency by referring to the chunk table 700, and thus, the Tier2 chunks 1102 remaining on the Tier2 pool 230-2 have a lower access frequency than those transferred to the Tier1 pool.

FIG. 8 illustrates an example of a pool operation carried out when adding new capacity to the Tier2 pool 230-2. This operation can be carried out independently of the condition of the Tier1 pool, such as whether or not the Tier1 pool includes Tier2 chunks. State 2-1 illustrates that used space 1001 of the Tier2 pool has reached to the threshold 1003 by carrying out requests for allocation of Tier2 chunks 1201. In this situation, the free space management module 200 indicates an alert of lack of free space to the administrator. Then, the free space management module 200 extends the capacity of the Tier2 pool by obtaining more capacity from the corresponding array group 250-2. State 2-2 illustrates that the size of Tier2 pool 230-2 has been extended. Extended capacity 1202 indicates the size of additional capacity which was obtained from the array group 250-2 and added to the Tier2 pool free space 1002.

FIG. 9 illustrates an example of a pool operation carried out for returning Tier2 chunks from the Tier1 pool 230-1 to Tier2 pool 230-2, such as when the used space 1001 of the Tier1 pool 230-1 has reached the threshold 1003. For example, as described above with respect to FIG. 7, Tier2 chunks 1302 might have been previously transferred from the Tier2 pool 230-2 to the Tier1 pool 230-1 at a time when Tier1 pool had a larger amount of free space. State 3-1 illustrates a situation in which the used space 1001 of the Tier1 pool 230-1 has reached to the threshold 1003 by responding to requests for allocation of Tier1 chunks 1301. In this situation, as described above with respect to FIG. 7, free space management module 200 checks chunk table 700 to determine whether or not any Tier2 chunks currently reside in the Tier1 pool. In the illustrated case of state 3-1, Tier2 chunks 1302 are mixed in with the Tier1 chunks 1301 in the Tier1 pool 230-1. This being the case, free space management module 200 determines a return size 1304 of Tier2 chunks 1302 to be returned to the Tier2 pool 230-2. Typically, this might be a predetermined size equal to the specified margin size 1004 of the Tier1 pool. If the total size of Tier2 chunks 1302 within the Tier1 pool is more than the predetermined size, then the return size 1304 is same as that predetermined size (e.g., the margin size 1004). On the other hand, when the total size of Tier2 chunks 1302 within the Tier1 pool is less than the predetermined size, then the return size 1304 is equal to the entire size of all Tier2 chunks currently maintained in the Tier1 pool. Further, in other embodiments, the return size might different sizes or might be unrelated to margin size.

Free space management module 200 then checks the Tier2 pool 230-2 to determine whether the Tier2 pool has sufficient free space 1002 to receive the return size 1304 of Tier2 chunks 1302. For example, if the used space 1001 of the Tier2 pool is near the threshold 1003, such as in the case illustrated by Condition B, then if the return size 1304 were to be added to the Tier2 chunks 1305, the threshold 1003 would be exceeded. Thus, in the case illustrated by Condition B, free space management module 200 would first perform the Tier2 pool extension process described above with respect to FIG. 8. In either case, i.e., where Tier2 pool already has enough free space 1002, or has to have its capacity extended, Tier2 pool 230-2 will be in the condition illustrated as Condition A in state 3-1 prior to relocating some or all of the Tier2 chunks 1302 from the Tier1 pool to the Tier2 pool.

State 3-2 illustrates that free space management module 200 moves the return size 1304 of Tier2 chunks from the Tier1 pool to the Tier2 pool. In this example, after completion of the movement of the moved Tier2 chunks 1313, enough free space 1002 of the Tier1 pool is generated to create margin space 1004, while there is still some amount of Tier2 chunks 1302 still located within the Tier1 pool 230-1. In exemplary embodiments, during the movement of Tier2 chunks from the Tier1 pool to the Tier2 pool, the free space management module 200 selects Tier2 chunks which have a low access frequency by referring the chunk table 700, so that the remaining Tier2 chunks 1302 on the Tier1 pool have a higher access frequency, whereby the ability of the Tier1 storage devices is better utilized. Furthermore, it should be noted that while in the illustrated embodiment a particular return size was utilized to create a particular margin size 1004, in other embodiments, other amounts of return sizes may be used.

Process Flows

FIG. 10 illustrates an example of a process for writing data to an unallocated area of a thin provisioned volume 230, as executed by thin provisioning module 800 in the storage system 100.

Step 1500: Client host 110 writes data (e.g., sends a write command) to one of the thin provisioned volumes 220 on the storage system 100. The invention described herein is not limited to any particular means for determining which tier of the storage system a particular client host 110 uses, or to which tier data is stored. For example, in some embodiments of the invention all new writes may be stored in Tier1, with data later being archived to Tier2 after the passage of a predetermined amount of time. In other embodiments, particular clients may be assigned to particular tiers depending on a level of service agreement with a storage service provider, or the like. Other methods of assigning tiers or classifying data are also covered by the present invention.

Step 1510: Thin provisioning module 800 checks whether a thin provisioning chunk has already been allocated for the specified portion of the thin provisioned volume identified in the write request (typically one or more logical blocks). If a thin provisioning chunk has already been allocated for the specified block(s), then the thin provisioning module 800 skips the allocating process and goes to Step 1540; otherwise the process goes to Step 1520 to generate new chunk.

Step 1520: Thin provisioning module 800 generates a new thin provisioning chunk from corresponding pool of the tier. In exemplary embodiments of the invention, during the generation of the new thin provisioning chunk, free space management module 200 may carry out pool operations such as those described above with respect to FIGS. 7-9 and below with respect to FIGS. 11-13.

Step 1530: Thin provisioning module 800 allocates the thin provisioning chunk obtained in Step 1520 to the area of the thin provisioned volume where the client host computer 110 wrote the data.

Step 1540: Thin provisioning module 800 executes the actual writing of data to the chunk allocated in Step 1530.

Step 1550: The process notifies the client host that the write operation was successful, and the process ends.

FIGS. 11A-11B illustrate an example process of Tier1 pool extension which was described above with respect to FIG. 7. This process is executed by free space management module 200, and may be triggered, for example, when generation of a Tier1 chunk is required (such as at Step 1520 of FIG. 10), and carried out along with the actual chunk allocation process that takes place during that step. Alternatively, other triggers for initiating the process may be implemented. For example, the process may be carried out after the process of FIG. 10 is completed by checking pool capacity at that time, or the like.

Step 1600: When used space 1001 of the Tier1 pool 230-1 has reached to the threshold 1003, as discussed above with respect to FIG. 7, the process goes to Step 1610; otherwise extension of the Tier1 pool is not required yet, and the process ends.

Step 1610: Free space management module 200 refers to the chunk table 700 to determine whether any Tier2 chunks are currently located in the Tier1 pool. If Tier2 chunks currently exist on the Tier1 pool, then the process goes to Step 1900 of FIG. 13 described below; otherwise if there are no Tier2 chunks currently allocated from the Tier1 pool, the process goes to Step 1620.

Step 1620: Free space management module 200 sends an alert of lack of free space of Tier1 pool to the administrator.

Step 1630: Free space management module 200 refers to the pool table 600, selects the record of the Tier1 pool from pool table 600 and gets the corresponding array group ID 670.

Step 1640: Free space management module 200 refers to the array group table 500, selects the record from array group table with the array group ID obtained in step 1630, and gets the corresponding available capacity size 530.

Step 1650: If there is not enough free space on the array group, the process goes to step 1660; otherwise the process goes to step 1680.

Step 1660: Free space management module 200 sends an alert to the administrator indicating the lack of available free space in the array group and indicating that capacity needs to be added.

Step 1670: Free space management module 200 waits for the administrator to add capacity to the corresponding array group. Note that this suspension is only for this process and is independent of the actual chunk allocation process, such as is set forth in FIG. 10. Typically, the threshold 1003 for each pool is set high enough to provide enough time to add more free space, while also still having sufficient free space to enable the pool to continue to function and allocate new chunks while the new free space is being added.

Step 1680: Free space management module 200 allocate new capacity from the corresponding array group to the Tier1 pool. This step may be done by free space management module 200 performing the operation itself, or by free space management module 200 invoking a specific allocation means from this step, such as thin provisioning module 800, a dedicated capacity allocation module, or the like.

Step 1700: After the capacity of the Tier1 pool has been extended, it is desirable to move a quantity of the Tier2 chunks onto the Tier1 pool so as to utilize the available greater performance of the Tier1 pool. To accomplish this, first, free space management module 200 calculates a quantity of Tier2 chunks to be moved onto the Tier1 pool according to the formula:

$$v\_MovableSize=(\text{Tier1 Free Space}-\text{Threshold})-(\text{Margin Space Size}),$$

where "v_MovableSize" is the size of Tier2 chunks that can be moved.

Step 1710: If v_MovableSize is equal to zero, then the process ends; otherwise the process goes to step 1720.

Step 1720: Free space management module 200 refers to chunk table 700 and selects a Tier2 chunk record from chunk table that has highest access frequency 740.

Step 1730: Free space management module 200 moves the data of the selected Tier2 chunk from the Tier2 pool to the Tier1 pool. The movement of data between tiers may be carried out by free space management module 200, or by thin provisioning module 800 under instruction from free space management module 200, or the like, using methods such as are described in US Pat. Appl. Pub. 2004/0162958 and U.S. patent application Ser. No. 11/605,440, incorporated herein by reference above.

Step 1740: Free space management module 200 updates the record of the selected chunk in chunk table 700 to change the entry for Placement 730 in chunk table 700 from "Tier2" to "Tier1".

Step 1750: Free space management module 200 decreases the value of variable v_MovableSize by the size of one chunk, and proceeds back to step 1710, such that chunks will be successively moved from Tier2 to Tier1 until the variable v_MovableSize equals zero.

FIG. 12 illustrates an exemplary process of Tier2 pool extension which was described above with respect to FIG. 8. The process is executed by free space management module 200, and is triggered initially when generation of a Tier2 chunk is required, such as in Step 1520 of FIG. 10, during the execution of the chunk allocation process. Alternatively, this process may also be triggered by the process during which Tier2 chunks are returned to the Tier2 pool, as described above with respect to FIG. 9 and as described below with respect to FIG. 13. For example, as discussed above, when it is necessary to return the Tier2 chunks from the Tier1 pool to the Tier2 pool, there may be a lack of free space at the Tier2 pool, which also requires Tier2 pool extension.

Step 1800: When used space 1001 of Tier2 pool has reached the threshold 1003, the process goes to Step 1810; otherwise, if there is still sufficient free space 1002 left in the Tier2 pool, the process ends.

Step 1810: Free space management module 200 sends an alert to the administrator indicating a lack of free space in the Tier2 pool.

Step 1820: Free space management module 200 refers to the pool table 600, selects the record of the Tier2 pool from the pool table 600, and gets the corresponding array group ID 670.

Step 1830: Free space management module 200 refers to the array group table 500, selects the corresponding record from array group table 500 having the array group ID obtained in step 1820, and gets the listed value of the available capacity 530.

Step 1840: If the amount of available capacity remaining in the array group is not sufficient, the process goes to Step 1850; otherwise the process goes to Step 1870.

Step 1850: Free space management module 200 sends an alert to the administrator indicating that there is a lack of available capacity in the corresponding array group and that capacity needs to be added to the available array group capacity.

Step 1860: Free space management module 200 waits for the administrator to add capacity to the array group. Note that this suspension is only for this process and is independent of the actual chunk allocation process, such as that set forth above with respect to FIG. 10.

Step 1870: When there is sufficient capacity in the array group, free space management module 200 allocates new capacity from the array group to the Tier2 pool. This step may be carried out by free space management module 200 itself, or by invoking a specific allocation means from this step, such as thin provisioning module 800, a dedicated capacity allocation module, or the like. If the process was initially called by the process for returning Tier2 chunks to the Tier2 pool, as set forth below in FIG. 13, then the process returns to Step 1940 of FIG. 13; otherwise the process ends.

FIG. 13 illustrates an exemplary process for returning Tier2 chunks to the Tier2 pool, as described above with respect to FIG. 9. The process is executed by free space management module 200, and may be triggered from Step 1610 of the Tier1 pool extension process described above with respect to FIGS. 7 and 11A-11B, such as when Tier1 chunk generation is necessary and Tier2 chunks are mixed in with the Tier1 pool.

Step 1900: Free space management module 200 selects all Tier2 chunks placed in Tier1 pool by referring to the chunk table 700 and comparing the contents of Data Content column 720 with the contents of Placement column 730. If the capacity size of the Tier2 chunks located in the Tier1 pool exceeds a predetermined maximum returning size, then the process goes to Step 1910; otherwise the process goes to step 1920.

Step 1910: Free space management module 200 sets a variable "v_ReturnSize" equal to the predetermined maximum returning size.

Step 1920: Free space management module 200 sets the variable "v_ReturnSize" equal to the capacity amount of the Tier2 chunks contained within the Tier1 pool.

Step 1930: Free space management module 200 compares "v_ReturnSize" with the free space 1002 of the Tier2 pool minus the threshold value. If the Tier2 pool does not have enough remaining free space to accommodate the entire quantity of returning Tier2 chunks, the process calls the Tier2 pool expansion process described above in FIG. 12 starting at Step 1820; otherwise, when there is sufficient free space existing in the Tier2 pool, the process goes to Step 1940.

Step 1940: Free space management module 200 determines whether the variable "v_ReturnSize" is equal to zero. If so, then the process ends; otherwise the process goes to step 1950.

Step 1950: Free space management module 200 refers to chunk table 700, selects the Tier2 chunk record from chunk table 700 that has a placement 730 listed as "Tier1" and that also has the lowest access frequency of those chunks which placement 730 has listed as "Tier1".

Step 1960: Free space management module 200 moves the selected Tier2 chunk from Tier1 pool to Tier2 pool.

Step 1970: Free space management module 200 updates Placement 730 of the record for the selected chunk in the chunk table 700 from "Tier1" to "Tier2".

Step 1980: Free space management module 200 decreases the variable "v_ReturnSize" by an amount equal to the size of one chunk and proceeds back to step 1940. Thus, Tier2 chunks are returned to the Tier2 pool until the variable "v_ReturnSize" reaches zero.

Based on the foregoing it may be seen that exemplary embodiments of the invention may be used on storage systems which incorporate storage mediums having a plurality of different characteristics to enable the provision of tiered storage service. Embodiments of the invention may utilize the tiered pools along with thin provisioning technology, and can also be used in the case in which normal storage volumes are allocated as having different tiers. Furthermore the number of tiers is not limited to only two tiers, but the invention may be applied to a tier structure having a number of different tiers by establishing a hierarchy of tier pools among the multiple tiers.

In exemplary embodiments, the system discovers when extra capacity has been added to the Tier1 pool. When there is enough free space, the system moves some amount of Tier2 chunks from the Tier2 pool to the Tier1 pool, so that the free spaces of the Tier1 and Tier2 pools are optimized. While moving Tier2 chunks to the Tier1 pool, Tier2 chunks that have recently been frequently accessed are selected first for movement to the Tier1 pool so that efficiency of the system is increased. When the free space of Tier1 pool becomes low while some Tier2 data is mixed in with the Tier1 pool, some amount of Tier2 chunks are returned to the Tier2 pool in order to make more room on the Tier1 pool.

Consequently, embodiments of the invention reduce the cost of storage resources by sharing free space among multiple tiers of storage, thereby minimizing the entire amount of unutilized space in a tiered storage system. Also, by sharing the free spaces of specific tiers between plural tiers, embodiments of the invention eliminate the redundant wasted capacity that results from having independent free spaces allotted to each tier. This reduces the necessity for administrators to buy extra capacity in advance, and capacity can be deployed only when the additional capacity is actually needed.

Of course, the system configurations illustrated in FIGS. 1A-1B are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for managing and controlling free space within tiered storage systems. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. An information system comprising:
one or more first storage media having first storage characteristics for making up a first pool of capacity of a first tier of storage;
one or more second storage media having second storage characteristics for making up a second pool of capacity of a second tier of storage;
array groups which are composed of plural storage media including the first storage medium and the second storage medium;
thin provisioning pools, including the first pool and the second pool, which are allocated from a portion of the array groups;
a provisioning module configured, for a write request directed to a thin provisioning volume of a tier, to generate a new thin provisioning chunk of a corresponding thin provisioning pool of the tier, and allocate the new thin provisioning chunk to an area of the thin provisioning volume if no thin provisioning chunk has been allocated thereto; and
a free space management module configured to allocate a new capacity from a corresponding array group to the corresponding thin provisioning pool in order to extend a capacity of the corresponding thin provisioning pool if a used space of the corresponding thin provisioning pool has reached a threshold.

2. The information system according to claim 1,
wherein, when the free capacity of the first pool reaches a first predetermined threshold, the provisioning module or the free space management module is configured to move a second quantity of the second tier data that is stored in said first tier of storage to the second tier of storage.

3. The information system according to claim 2,
wherein, the provisioning module or the free space management module is configured to first move the second tier data that is least frequently accessed from the first tier of storage to the second tier of storage.

4. The information system according to claim 2,
wherein, when the free capacity of the second pool is insufficient to accommodate the second quantity of the second tier data moved to the second tier without surpassing a second predetermined threshold, the free space management module is configured to allocate the new capacity from the array group to the second pool in order to first extend the free capacity of the second pool.

5. The information system according to claim 1, wherein, following movement of all second tier data stored in the first tier to the second tier, when the free capacity of the first pool reaches the first predetermined threshold, the free space management module is configured to allocate the new capacity from the corresponding array group to the first pool in order to extend the free capacity of the first pool.

6. The information system according to claim 1, wherein, following extending of the free capacity of the first pool, the provisioning module or the free space management module is configured to move second tier data from the second tier to the first tier.

7. The information system according to claim 1, wherein, the provisioning module or the free space management module is configured to first move the second tier data that is most frequently accessed from the second tier of storage to the first tier of storage.

8. The information system according to claim 1, wherein, the storage system is a thin provisioning storage system in which capacity is allocated when write data is first stored to an area of the first tier of storage or the second tier of storage, and
wherein the second tier data is moved from the second tier to the first tier by assigning one or more chunks of capacity from the first pool for storing the second tier data in the first tier of storage.

9. The information system according to claim 1, wherein, the one or more first storage media are contained in a first storage system having a first controller, the one or more second storage media are contained in a second storage system in communication with the first storage system via a network, and the provisioning module and the free space management module are located in a management computer, said management computer being in communication with the first storage system and the second storage system via the network.

10. The information system according to claim 1, wherein, the one or more first storage media and the one or more second storage media are contained in a first storage system,
said first storage system having a first controller including the provisioning module and the free space management module, said first controller controlling data access to the first and second storage media.

11. The information system according to claim 1, further comprising:
a data structure information which defines the threshold to each thin provisioning pool,
wherein the free space management module extends the capacity of the thin provisioning pool if the used space of the thin provisioning pool has reached the threshold corresponding to the thin provisioning pool in the data structure information.

12. The information system according to claim 1, further comprising:
a data structure information which defines an allocating array group to each thin provisioning pool,
wherein the free space management module allocates the new capacity from the array group corresponding to the thin provisioning pool in the data structure information.

13. The information system according to claim 1, wherein the free space management module waits until completion of a process to add new capacity to the corresponding array group, then the free space management module allocates the new capacity.

14. A method of storing data, comprising:
providing a plurality of tiers of storage, each said tier having storage characteristics differing from storage characteristics of the other said tiers;
providing a plurality of first storage media having first storage characteristics, said first storage media being arranged in a first storage array, for providing a first pool of capacity of a first tier of storage of said plurality of tiers of storage;
providing a plurality of second storage media having second storage characteristics, said second storage media being arranged in a second storage array, for providing a second pool of capacity of a second tier of storage of said plurality of tiers of storage;
providing array groups which are composed of plural storage media including the first storage medium and the second storage medium;
providing thin provisioning pools, including the first pool and the second pool, which are allocated from a portion of the array groups;
for a write request directed to a thin provisioning volume of a tier, generating a new thin provisioning chunk of a corresponding thin provisioning pool of the tier, and allocating the new thin provisioning chunk to an area of the thin provisioning volume if no thin provisioning chunk has been allocated thereto; and
allocating a new capacity from a corresponding array group to the corresponding thin provisioning pool in order to extend a capacity of the corresponding thin provisioning pool if a used space of the corresponding thin provisioning pool has reached a threshold.

15. The method according to claim 14, further comprising a step of moving a second quantity of the tier two data that is stored in the first tier of storage to the second tier of storage when the free capacity of the first pool reaches a first predetermined threshold.

16. The method according to claim 15, further comprising a step of moving earliest from the first tier to the second tier the second tier data that is least frequently accessed of the second tier data.

17. The method according to claim 15, further comprising a step of
allocating the new capacity from the array group to the second pool in order to first extend the free capacity of the second pool when the free capacity of the second pool is insufficient to accommodate the second quantity of the second tier data without falling below a second predetermined threshold.

18. The method according to claim 14, further comprising a step of
extending the free capacity of the first pool when the free capacity of the first pool reaches the first predetermined threshold, and following movement of all second tier data stored in the first tier to the second tier, extending the free capacity of the first pool.

19. A tiered storage system having thin provisioning capability, comprising:
one or more first storage media having first storage characteristics for making up a first pool of capacity of a first tier of storage;
one or more second storage media having second storage characteristics for making up a second pool of capacity of a second tier of storage;

array groups which are composed of plural storage media including the first storage medium and the second storage medium;
thin provisioning pools, including the first pool and the second pool, which are allocated from a portion of the array groups;
a provisioning module configured, for a write request directed to a thin provisioning volume of the first tier, to generate a new thin provisioning chunk of the first pool of the first tier, and allocate the new thin provisioning chunk to an area of the thin provisioning volume if no thin provisioning chunk has been allocated thereto; and
a free space management module configured to allocate a new capacity from a corresponding array group to the first pool in order to extend a capacity of the first pool if a used space of the first pool has reached a threshold.

20. The tiered storage system according to claim 19,
wherein, when allocation of the new chunk of storage capacity causes the free capacity of the first pool to reach a first predetermined threshold, the controller free space management module is configured to determine whether there are any storage chunks allocated from the first pool currently being used for storing second tier data, and, when such is the case, the provisioning module or the free space management module is configured to move a quantity of the second tier data that is stored in said first tier to the second tier by allocating new storage chunks from the second pool.

21. The tiered storage system according to claim 20,
wherein, the provisioning module or the free space management module is configured to first move the second tier data that is least frequently accessed from the first tier of storage to the second tier of storage.

22. The tiered storage system according to claim 19,
wherein, when there is no second tier data stored in storage chunks allocated from the first pool when the free capacity of the first pool reaches the first predetermined threshold, the free space management module is configured to allocate the new capacity from the array group to the first pool in order to extend the free capacity of the first pool.

23. The tiered storage system according to claim 19,
wherein, following extending of the free capacity of the first pool, the provisioning module or the free space management module is configured to move second tier data from the second tier to the first tier by moving the second tier data that is most frequently accessed to storage chunks allocated from the first pool.

* * * * *